M. R. McGREGOR.
Lap-Rings.

No. 217,631. Patented July 15, 1879.

WITNESSES:
Henry N. Miller
C. Sedgwick

INVENTOR:
M. R. McGregor
BY Munn & Co
ATTORNEYS.

UNITED STATES PATENT OFFICE.

MOSES R. McGREGOR, OF PINE BLUFF, ARKANSAS, ASSIGNOR TO HIMSELF AND LEWIS McGREGOR, SAME PLACE.

IMPROVEMENT IN LAP-RINGS.

Specification forming part of Letters Patent No. 217,631, dated July 15, 1879; application filed May 13, 1879.

*To all whom it may concern:*

Be it known that I, MOSES R. MCGREGOR, of Pine Bluff, in the county of Jefferson and State of Arkansas, have invented a new and improved Lap-Ring, of which the following is a specification.

My invention consists in a lap-ring or link of novel construction, adapted for use with plows and chains, and wherever available.

Figure 1:
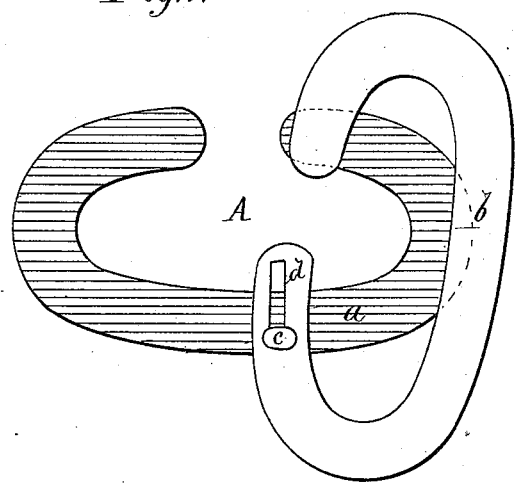
Figure 2:
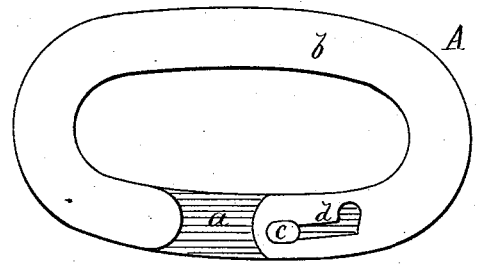
Figure 3:
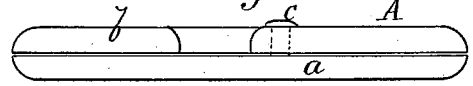

The invention will be described in connection with the accompanying drawings, wherein Figure 1 is a side view of the lap-ring as opened. Fig. 2 is a similar view of the same closed. Fig. 3 is an end view.

Similar letters of reference indicate corresponding parts.

A is my improved lap-ring, which consists of the two flat links $a\ b$, of similar size and shape, each having an opening at one side, and connected together for operation, as next described.

Upon one link, $a$, as represented, is fixed a flat-sided pin or lug, $c$, which passes through a slot, $d$, that is formed in the other link, $b$, and pin $c$ is headed or upset upon link $b$, so as to retain the links together.

The pin $c$ is oblong in direction of slot $d$, and fits closely therein, so that the link $b$ may not turn on the pin, except at one end of the slot, which is enlarged to permit the links to turn on each other when they are moved lengthwise, to bring the pin at that end of the slot. This lengthwise movement cannot occur when the lap-ring is in use, and accidental displacement is thereby prevented.

I prefer to place the slot $d$ in one end, next the side opening, and the pin upon the closed side of the other link, so that the slot does not weaken the link, and when placed together as described the openings come at opposite sides, and a continuous ring or link is formed.

The ring is opened by first sliding the links $a\ b$ in opposite directions, and then turning them to a position at right angles, as shown in Fig. 1.

This construction furnishes a simple and durable lap-ring, which can be quickly and conveniently manipulated.

Having thus described my invention, I claim as new and desire to secure by Letters Patent—

A lap-ring, consisting of two parts, $a\ b$, the part $a$ having the oblong lug $c$ nearly opposite its opening, and the part $b$ having a key-hole or L slot, $d$, arranged near one end, as shown and described.

MOSES R. McGREGOR.

Witnesses:
  J. A. HOOD,
  JOE W. LOCKHURT.